(12) United States Patent  
Cerruti

(10) Patent No.: US 6,628,322 B1  
(45) Date of Patent: **\*Sep. 30, 2003**

(54) DEVICE AND METHOD FOR POSITIONING A MEASURING HEAD ON A NONCONTACT THREE-DIMENSIONAL MEASURING MACHINE

(75) Inventor: Piero Cerruti, Turin (IT)

(73) Assignee: Brown & Sharpe Dea, S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,270

(22) Filed: Aug. 6, 1999

(30) Foreign Application Priority Data

Aug. 7, 1998 (IT) .......................... TO98A0693

(51) Int. Cl.$^7$ ............................. H04N 7/18; H04N 9/47
(52) U.S. Cl. ....................... 348/141; 348/135; 348/136; 348/140
(58) Field of Search ................................ 382/128, 141, 382/151, 152, 154; 33/503; 348/86, 94, 95, 128, 131, 141, 136, 140

(56) References Cited

U.S. PATENT DOCUMENTS

| | | | |
|---|---|---|---|
| 4,961,155 A | | 10/1990 | Ozeki et al. |
| 5,396,281 A | * | 3/1995 | Maeda ........................ 348/141 |
| 5,460,758 A | * | 10/1995 | Langer ........................ 264/401 |
| 5,696,837 A | * | 12/1997 | Green ........................ 382/128 |
| 5,778,548 A | * | 7/1998 | Cerruti ........................ 33/503 |
| 5,805,289 A | | 9/1998 | Corby, Jr. et al. |
| 6,044,170 A | * | 3/2000 | Migdal ........................ 382/154 |

FOREIGN PATENT DOCUMENTS

GB           2301183 A        11/1996

OTHER PUBLICATIONS

U.K. Search Report dated Nov. 15, 1999.

\* cited by examiner

Primary Examiner—Vu Le  
Assistant Examiner—Charles Parsons  
(74) Attorney, Agent, or Firm—Hall, Priddy, Myers & Vande Sande

(57) ABSTRACT

A positioning device for a measuring machine wherein a measuring head is movable in a three-dimensional space with respect to a first reference system, and supports a visual sensor having a television camera and a source of a laser beam. The device displays on a monitor the two-dimensional image picked up by the camera and on which is positionable a pointer movable by manual control to select a point of interest in the displayed two-dimensional image. The device moves the measuring head automatically into a position in which the origin of a second reference system, proper to the visual sensor and having two coordinate axes in the two-dimensional image plane, is located at a point, in the three-dimensional space, corresponding to the point of interest selected on the two-dimensional image.

16 Claims, 9 Drawing Sheets

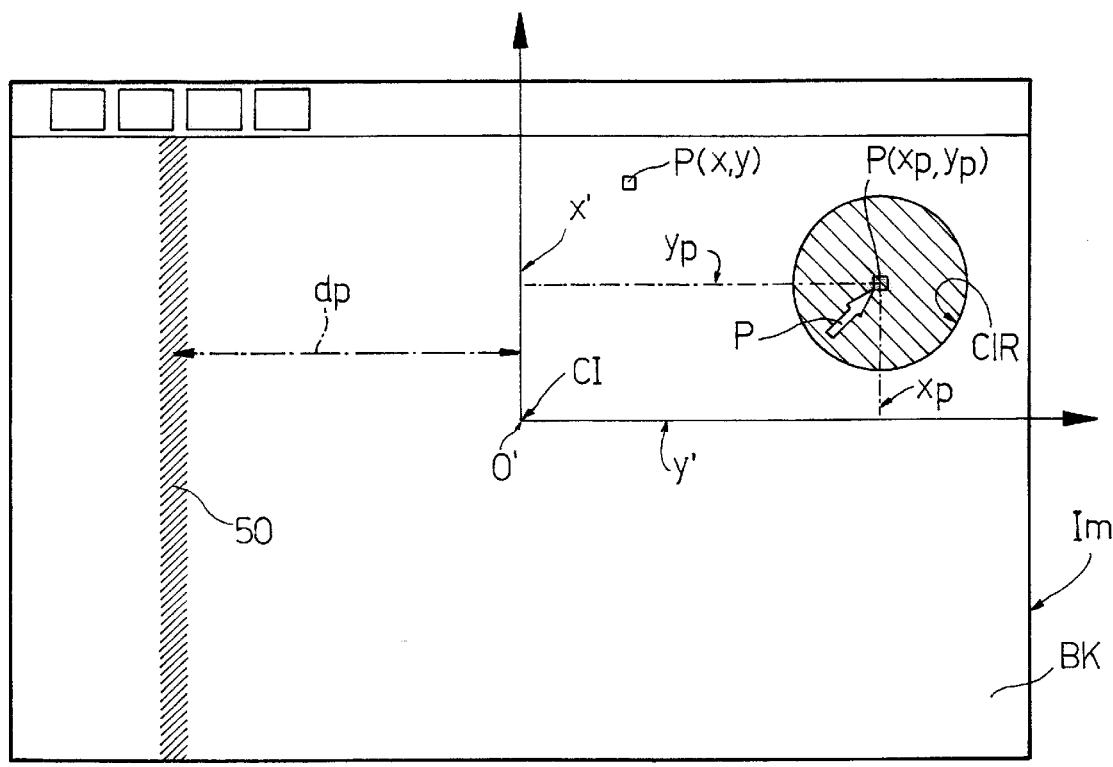
Fig.7
Fig.8
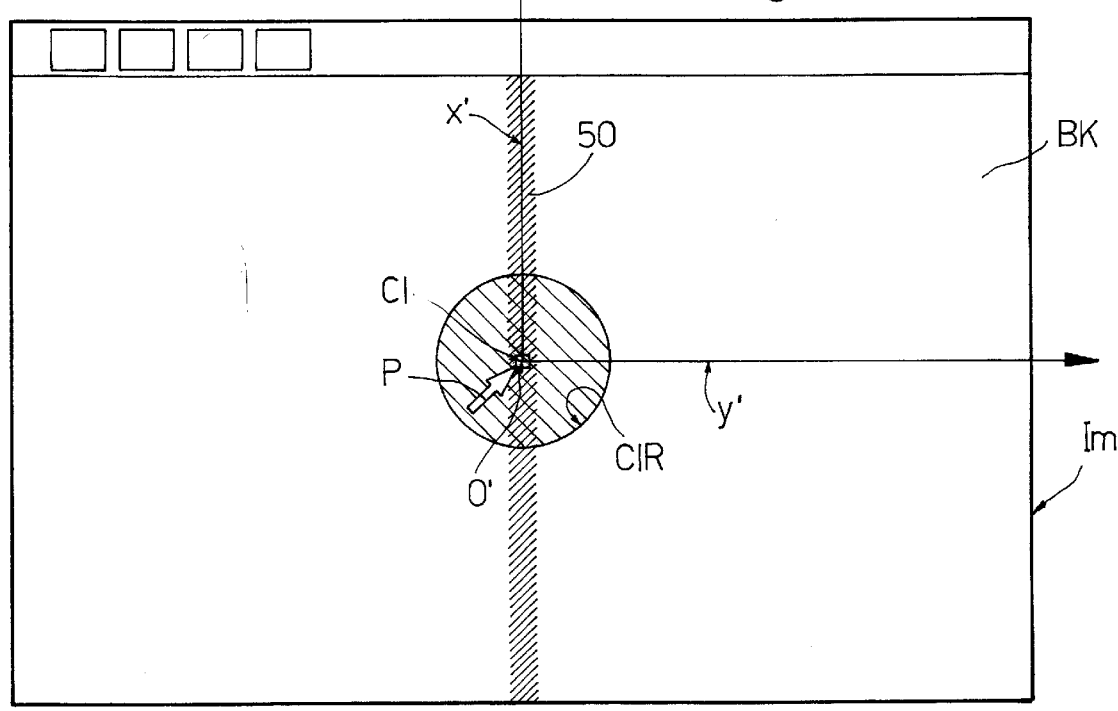

DEVICE AND METHOD FOR POSITIONING A MEASURING HEAD ON A NONCONTACT THREE-DIMENSIONAL MEASURING MACHINE

The present invention relates to a device and method for positioning a measuring head on a noncontact three-dimensional measuring machine.

BACKGROUND OF THE INVENTION

Noncontact three-dimensional measuring machines are known in which a member is movable along three coordinate X, Y, Z axes of a first reference system of the machine, and carries a measuring head articulated with respect to the movable member and supporting a visual sensor comprising a television camera and a laser beam generator.

The camera picks up a three-dimensional space (e.g. a pyramid-shaped solid angle) having an optical axis of symmetry which intersects the axis of symmetry of the laser beam at a point (reference center) defining the origin of a second X', Y', Z' reference system of the visual sensor, the Z' axis of which is aligned with the optical axis of symmetry of the camera. The image picked up by the camera comprises a two-dimensional image of the object in the measuring space, which image has a visible (laser) line formed by the laser beam intersecting the object, and is viewed by the measuring machine operator on a monitor.

By means of a processing device, the two-dimensional image picked up by the camera and the position in the two-dimensional image of the laser beam with respect to a reference position (conveniently a central position in the image—image center) are analyzed automatically to determine the coordinates of points on the object with respect to the second X', Y', Z' reference system of the visual sensor; and the measurement is then related by the processing device to the first X, Y, Z reference system of the measuring machine.

A major drawback of known measuring machines is encountered when positioning the measuring head, i.e. when moving the measuring head into position close to the object to be measured. That is, the measuring head is moved manually by means of a control device, in particular a joystick, which generates a signal to move the measuring head along the three X, Y, Z machine axes, whereas the image observed by the operator on the monitor is that picked up by the visual sensor and oriented according to the three X', Y', Z' axes which do not correspond with the X, Y, Z machine axes. Moreover, since the operator can only control the measuring head along the X, Y, Z axes and does not know the relationship between the X', Y', Z' and X, Y, Z axes, considerable difficulty is encountered by the operator in positioning the measuring head using the manual control device and the image shown on the monitor.

SUMMARY OF THE INVENTION

It is an object of the present invention to provide a measuring device enabling the measuring head to be moved easily as required and to be set to a predetermined position with respect to the object using the image of the object on the monitor.

According to the present invention, there is provided a device for positioning a measuring head of a noncontact three-dimensional measuring machine, as described in claim 1.

The present invention also relates to a method of positioning a measuring head of a noncontact three-dimensional measuring machine, as described in claim 9.

BRIEF DESCRIPTION OF THE DRAWINGS

A non-limiting embodiment of the invention will be described by way of example with reference to the accompanying drawings, in which:

FIG. 7 shows a first image processed by the measuring device according to the present invention;

FIG. 8 shows a second image processed by the measuring device according to the present invention;

DETAILED DESCRIPTION OF THE INVENTION

Figure 1:
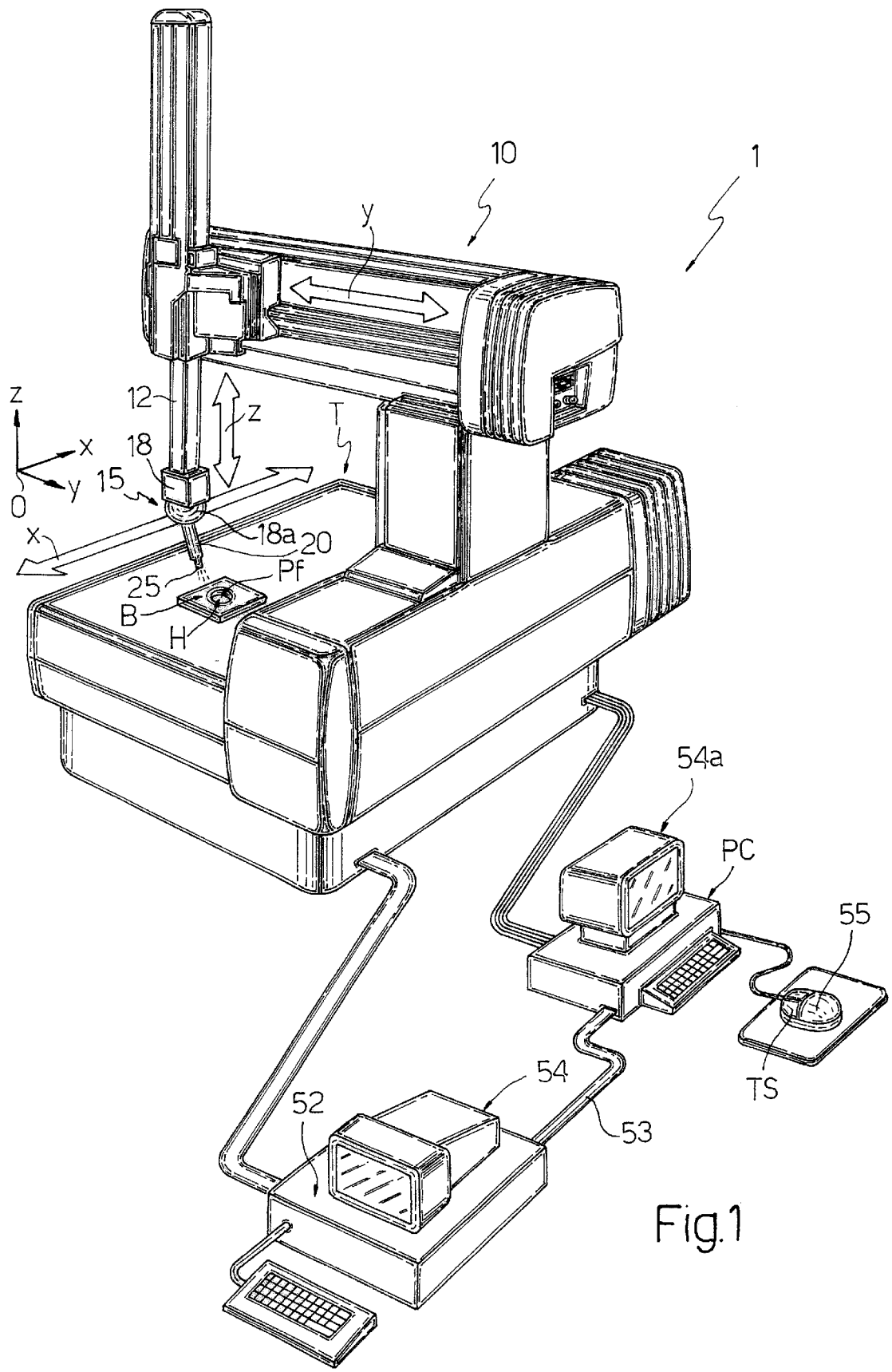
FIG. 1 shows a noncontact three-dimensional measuring device in accordance with the teachings of the present invention.

Number 1 in FIG. 1 indicates as a whole a noncontact three-dimensional measuring device wherein a known, e.g. movable-gantry-type, measuring machine 10 comprises a member (column) 12 which is moved by actuators (not shown) in three perpendicular coordinate directions X, Y, Z in a three-dimensional measuring space T.

Measuring machine 10 therefore has a respective X, Y', Z reference system (also known as machine reference system with axes X, Y, Z referred to as machine axes) having an origin O, and comprises known electronic measuring transducers (not shown) for determining the X, Y, Z position of movable member 12 with respect to origin O of the X, Y, Z reference system.

Figure 2A:
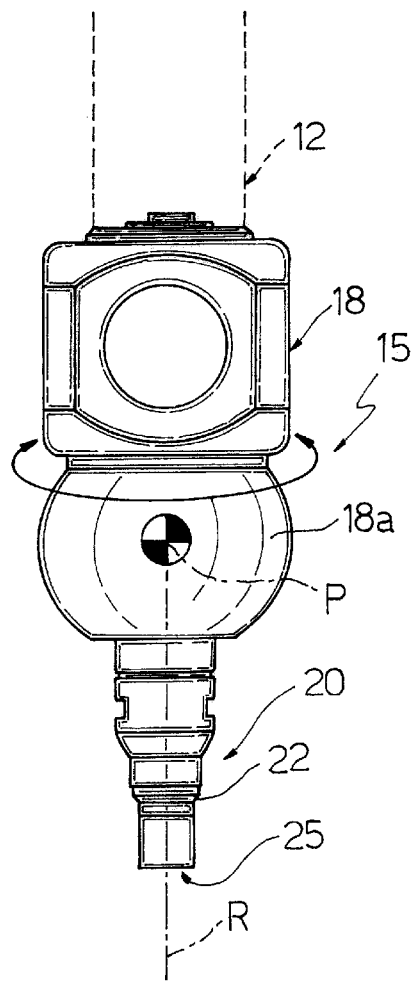
FIG. 2a shows a larger-scale view of a measuring head of the FIG. 1 device in a first operating position.
Figure 2B:
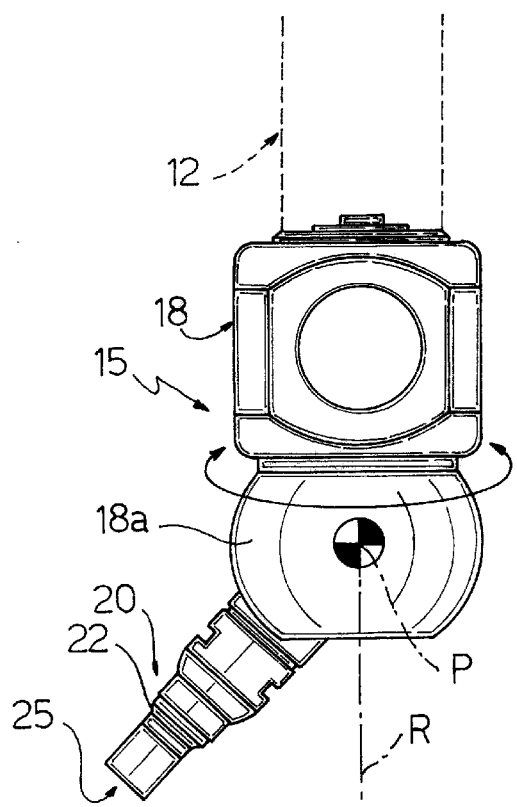
FIG. 2b shows the FIG. 2a head in a second operating position.

Measuring device 1 also comprises a measuring head (known) carried by movable member 12. More specifically, measuring head 15 comprises a first body 18 which is fitted stably to movable member 12; and a second body 20 (FIGS. 2a, 2b) which is axially symmetrical and is movable with respect to first body 18. More specifically, second body 20 comprises a first end portion hinged to a movable end portion 18a of the first body, and may therefore rotate about a substantially horizontal axis indicated P in FIGS. 2a, 2b (PITCH angle); and movable end portion 18a may rotate, with respect to movable member 12, about a respective axis of symmetry R (ROLL angle).

The PITCH and ROLL angles vary discretely and therefore finitein number.

Measuring head 15 therefore has two "degrees of freedom" defined by said PITCH and ROLL rotations respectively.

Body 20 has a second end portion with a connecting device 22 (shown schematically) by which to assemble a visual sensor 25 (shown schematically).

Figure 3:
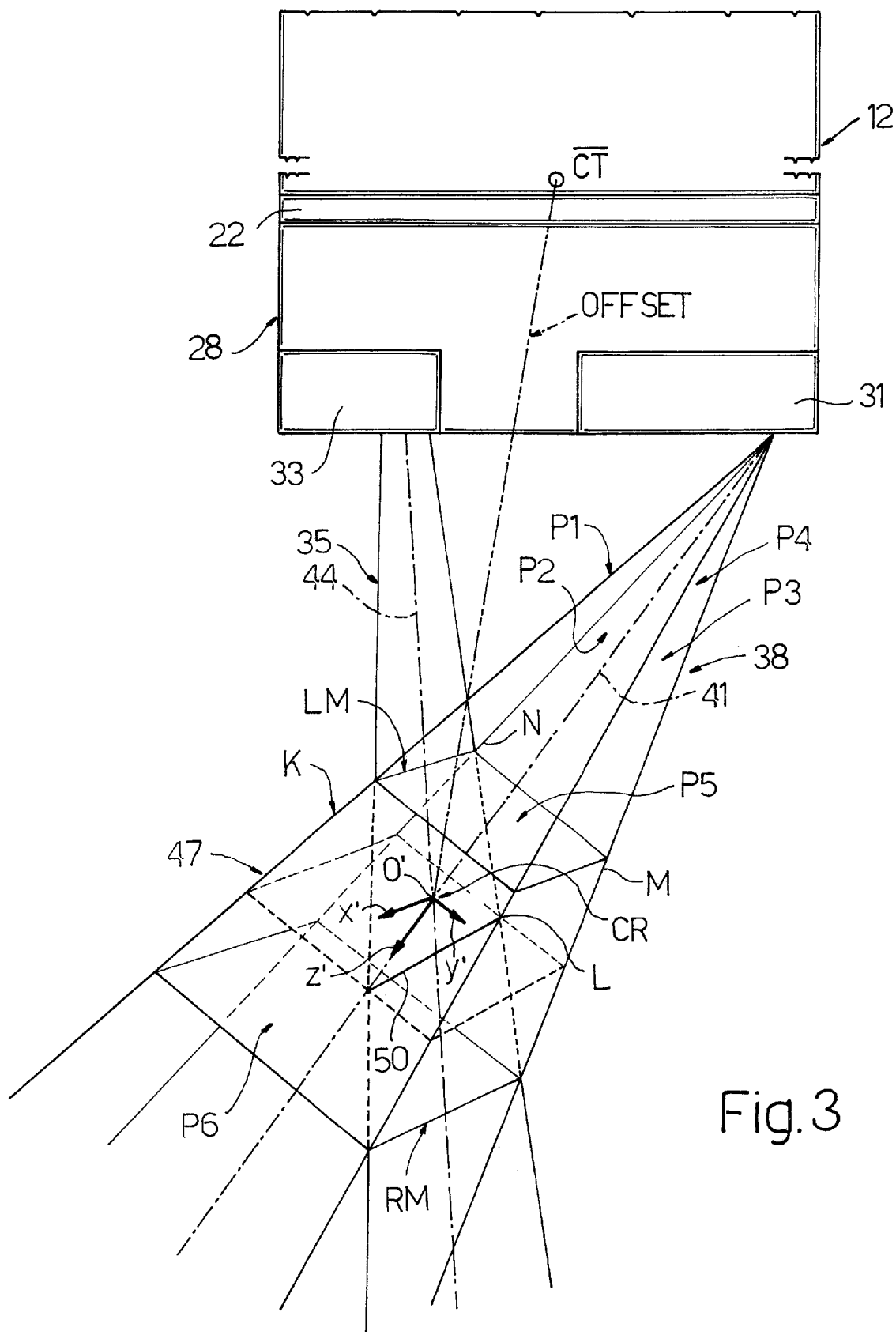
FIG. 3 shows the operating principle of the visual sensor on the measuring head.

With reference to FIG. 3, visual sensor 25 comprises an outer casing 28 which is fitted to connecting device 22 and houses a television camera 31 (shown schematically) and a source 33 of a laser beam 35. Camera 31 picks up a three-dimensional space 38 represented in FIG. 3 by a pyramid-shaped solid angle with the vertex located at the lens (not shown) of camera 31. Solid angle 38 has a respective optical axis 41 (shown by a dot-and-dash line) and is defined by-four planes P1, P2, P3, P4 which intersect to define four edges K, L, M, N (indicated by straight lines) of solid angle 38.

Laser beam 35 has a respective axis of symmetry 44 (shown by a dot-and-dash line) which intersects three-dimensional space 38; and the point at which axes 44 and 41 meet is indicated CR (reference center).

The intersection of laser beam 35 and solid angle 38 defines a measurable space 47 in the form of a truncated pyramid defined laterally by portions of planes P1, P2 P3, P4 and by rectangular base planes P5 and P6 perpendicular to axis 41. More specifically, plane P5 has a straight edge LM defined by beam 35 intersecting plane P1, and plane P6 has a straight edge RM defined by beam 35 intersecting plane P3 opposite plane P1.

Figure 4A:
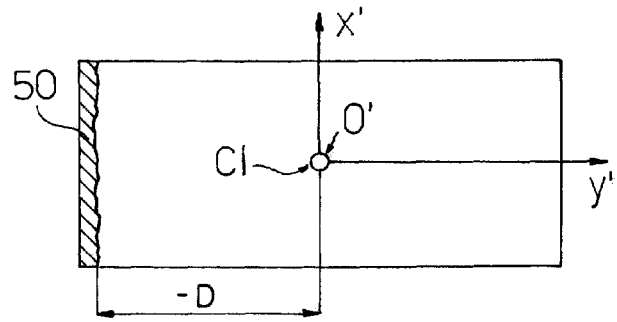
FIGS. 4a, 4b, 4c show respective images picked up by the visual sensor.
Figure 4B:
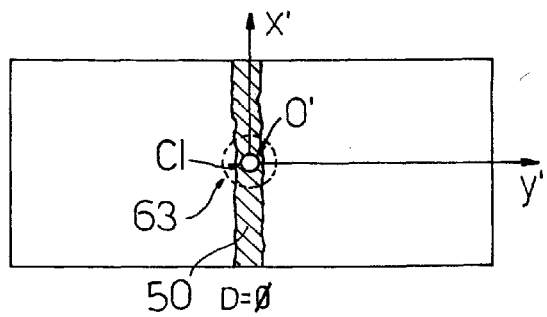
Figure 4C:
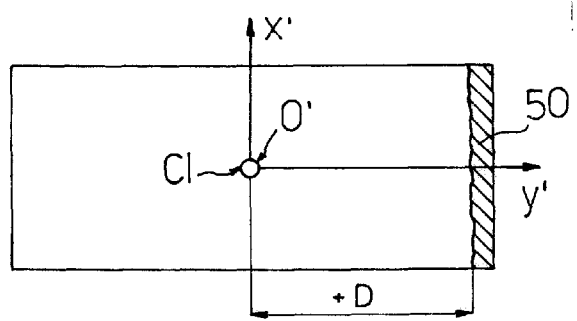

FIGS. 4a, 4b, 4c show a number of images to illustrate the operating principle of visual sensor 25. FIGS. 4a, 4c show images picked up by camera 31 relative to a flat object (e.g. a metal plate, not shown) coplanar with plane P5 and plane P6 respectively; and each image has a line (laser line) 50 formed by beam 35 intersecting the object.

More specifically, laser line 50 is located at the left lateral edge of the FIG. 4a image, and at the right lateral edge of the FIG. 4c image. In the event the flat object is coplanar with a plane through point CR (reference center) and perpendicular to axis 41, laser line 50 is located halfway along the image (FIG. 4b).

Movement of the object within measuring space 47 therefore moves laser line 50 in the detected image; which movement of the laser line with respect to a fixed reference point in the image—e.g. distance D between laser line 50 and the image center CI—is related to the position of the object along axis 41, and therefore to the distance of the object from camera 31. In the example embodiment shown, the image is rectangular, image center CI coincides with the point at which the bisectors of the inside angles of the rectangular perimeter of the image meet, and distance D is measured parallel to a major side of the rectangular image.

By measuring distance D in the image picked up by the camera, it is therefore possible, by means of known trigonometric calculations, to determine the real distance between the object and the camera.

Visual sensor 25 has a respective internal X', Y', Z' reference system, the origin O' of which is located at reference center CR, and the Z' axis of which is aligned along axis 41 (FIG. 3).

More specifically, in the rectangular two-dimensional image picked up by camera 31, axes X', Y' can be oriented coplanar with the image plane, with origin O' located at image center CI (FIGS. 4a–4c); and the position of the Z' axis, which therefore cannot be determined directly in the image, is determined with the aid of laser line 50 as stated previously.

Device 1 (FIG. 1) also comprises a central processing unit 52 (FIG. 1) conveniently defined by a VAX microcomputer which communicates with measuring machine 10 (from which it receives the member 12 position measurement) and with visual sensor 25. More specifically, sensor 25 is connected to a personal computer PC (e.g. a PC 486) for processing the image and which in turn is connected by a DECNET network 53 to unit 52 to supply the three-dimensional information determined within measuring space 47.

Also provided are a video terminal 54 connected to unit 52 for interfacing with the measuring machine; and a video terminal (monitor) 54a connected to the PC to display the image and enter various characteristic sensor parameters.

To operate, device 1 requires a number of so-called intrinsic and extrinsic calibration parameters.

Intrinsic parameters describe the internal performance of visual sensor 25 and are inherent in visual sensor 25 itself.

Camera 31 supplies a two-dimensional image (FIGS. 4a–4c) defined by a rectangular matrix of (e.g. 500×582) pixels, and in which the information relative to the position (i.e. the distance) of the object along the Z' axis is determined indirectly by measuring and processing the value of distance D between laser line 50 and image center CI, as stated previously.

The real dimensions of the object (along axes X', Y') can be determined directly by examining and converting corresponding dimensions of the image by means of an appropriate scale factor.

Each pixel in the image picked up by the camera therefore corresponds to a real dimension (in millimeters) which is a function of the distance of the object from camera 31, i.e. a real dimension of the object (along the X' or Y' axis) is related to the dimension in the image by a scale factor which is a function of the distance along the Z' axis:

real dimension (in mm)=pixel dimension* f(Z') where f(Z') is defined by a set of intrinsic parameters.

Extrinsic parameters, on the other hand, relate visual sensor 25 to the measuring volume of measuring machine 10.

That is, visual sensor 25 generates measurements referenced to the X', Y', Z' reference system, within measuring space 47, and which are related to the X, Y, Z reference system of machine 10 by means of extrinsic parameters.

In particular, device 1 employs:
  a first set of extrinsic parameters defined by the rotation matrix ROT-MAX relating the X, Y, Z to the X', Y', Z' reference system;
  a second set of extrinsic parameters describing the CT-CR or so-called OFFSET vector (where CR is the origin of the X', Y', Z' reference system, and CT is the center of movable member 12 (FIG. 3)).

The above extrinsic parameters are calculated for each possible orientation of measuring head 15.

Figure 5:
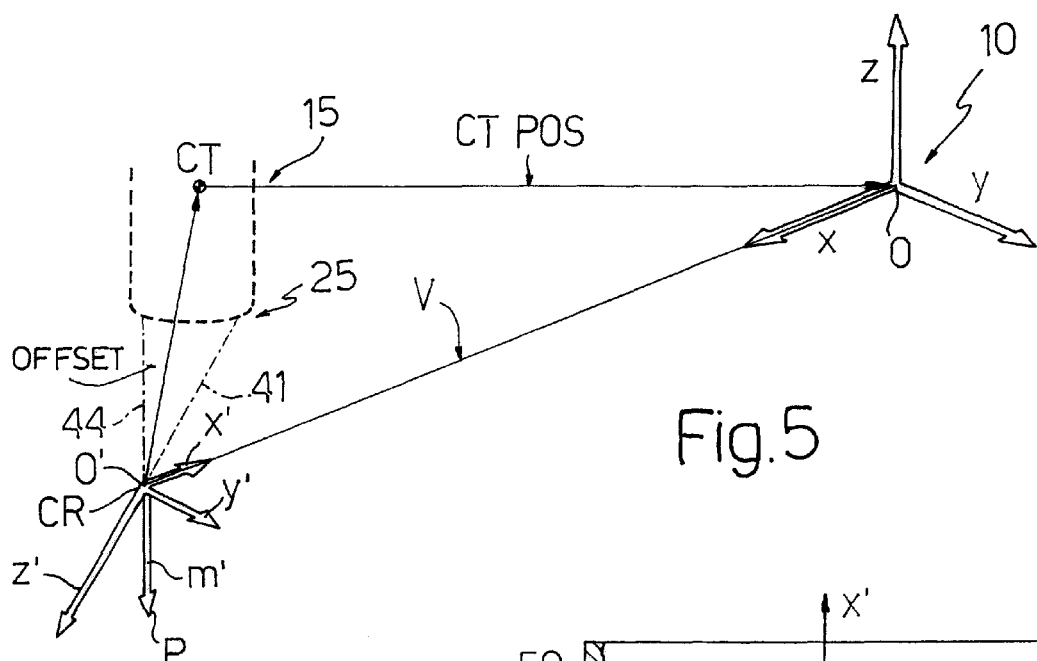
FIG. 5 shows the relationships between two different reference systems employed on the measuring device according to the present invention.

FIG. 5 shows the relationships between the two reference systems to illustrate clearly the operations performed by measuring device 1 and how the intrinsic and extrinsic parameters are used to perform the measurement.

More specifically, FIG. 5 shows the Cartesian X, Y, Z reference system of measuring machine 10; the X', Y', Z' reference system of visual sensor 25; the OFFSET vector extending between origin O' of the X', Y', Z' reference system and the head center CT of movable member 12; the vector CTPOS extending between origin O of the X, Y, Z reference system and head center CT; and the vector V extending between origin O of the X, Y, Z reference system and origin O' of the X', Y', Z' reference system.

For any point P in space, visual sensor 25 supplies a measurement expressed by a vector m', which is referenced to and oriented with respect to the cartesian X', Y', Z' reference system and must be related to the X, Y, Z reference system.

For which purpose, by means of rotation matrix ROT-MAX, the vector m' determined by visual sensor 25 is converted by measuring device 1 (in known manner) according to the equation m=ROT-MAX x(m') to generate a vector m oriented according to the X, Y, Z reference system.

Vector m must also be added to vector V to relate the measurement of point P to the X, Y, Z reference system and obtain a measurement M of point P with respect to X, Y, Z i.e. M=m+V.

Vector V is calculated by adding vector CTPOS and the OFFSET vector. More specifically, vector CTPOS is supplied by the transducers (not shown) located along the three axes of machine 10 (vector CTPOS describes the position of head center CT of movable member 12 with respect to the X, Y, Z reference system), while the OFFSET vector is, as stated, one of the extrinsic parameters.

The calibration parameters (intrinsic and extrinsic parameters) are calculated in known manner—e.g. as described in Italian Patent Application TO95A-000388—and are therefore not dealt with here for the sake of brevity.

Figure 6:
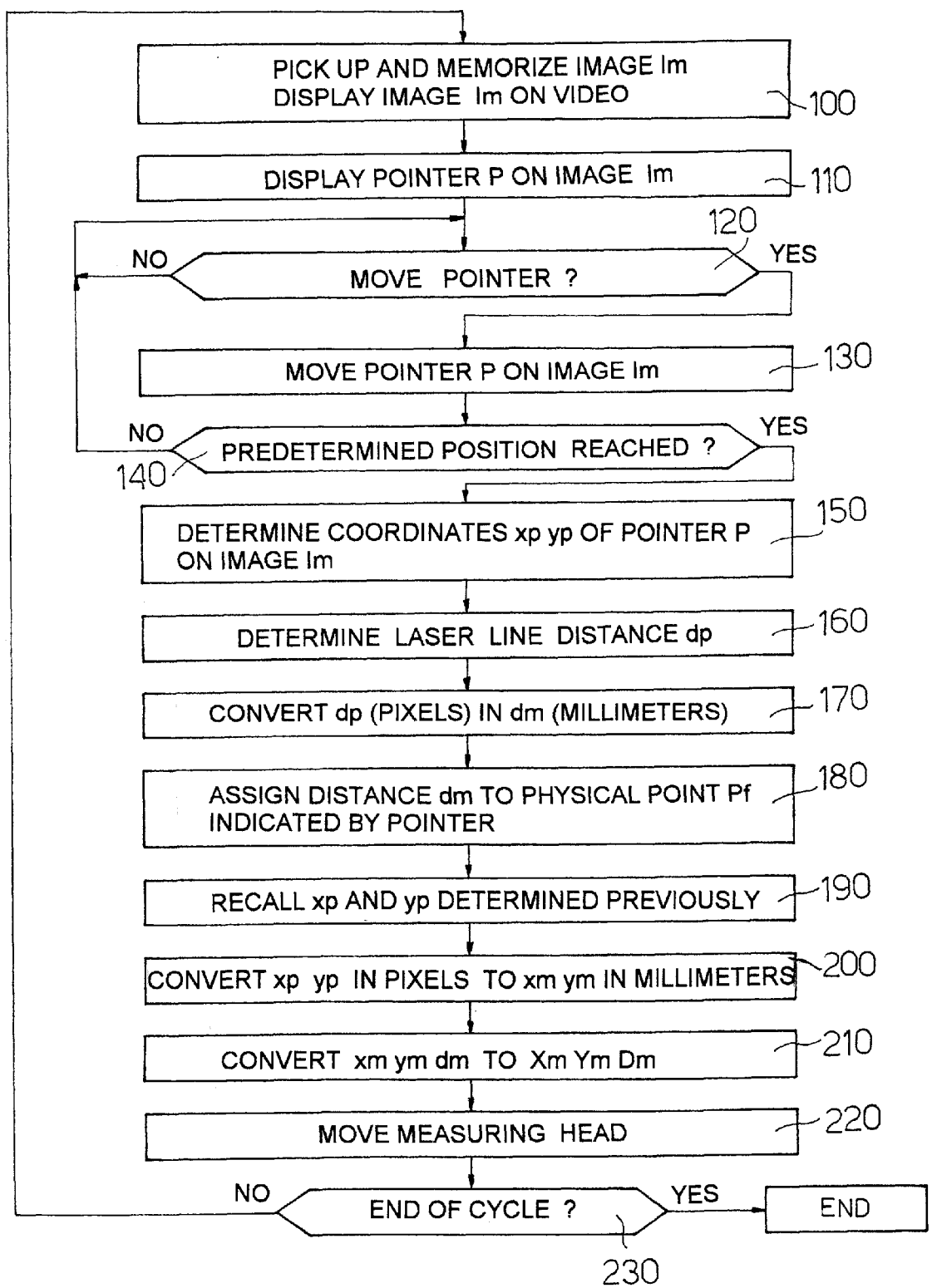
FIG. 6 shows a series of steps performed by the measuring device according to the present invention.

FIG. 6 shows a logic block diagram of the operations performed by the positioning device according to the present invention. The positioning device is defined by electronic circuits integrated in central processing unit 52 and/or in personal computer PC, but may obviously comprise a number of separate electronic circuits communicating with measuring machine 10.

To begin with, a block 100, by means of camera 31, picks up an image Im of whatever is located in measuring space 47. Image Im, as stated, is defined by a matrix of points (pixels) P(x,y), each defined by a whole number relative to the brightness of point P(x,y), and is memorized temporarily and displayed on video terminal 54a to enable the operator to observe directly what visual sensor 25 "sees."

One example of the image Im displayed on video terminal 54a is shown in FIG. 7, in which image Im relates to the measurement of a flat plate B (FIG. 1) with a hole H, and therefore comprises a background BK (representing the image of flat plate B) of substantially constant brightness, and a circular portion CIR (representing the image of hole H) darker than background BK.

Image Im may conveniently, though not exclusively, show the Y' and X' axes with origin O' located at the center CI of image Im.

The Y' and X' axes are perpendicular to each other and lie in the plane defined by the detected two-dimensional image Im.

Block 100 is followed by a block 110 which provides for displaying on image Im a pointer P, which may conveniently, though not exclusively, be defined by an arrow.

Pointer P (via normal processing device operations) may be moved manually (FIG. 1) by means of a control device 55 (mouse) connected to personal computer PC to enable the operator (not shown) to position pointer P manually at any point on image Im.

For which purpose, block 110 is followed by a block 120 which awaits a manual command (using mouse 55) to move pointer P; and, when the manual command is detected, block 120 goes on to a block 130 which converts the electric signal generated by mouse 55 into a processed signal of personal computer PC which moves the pointer as requested on image Im.

Block 130 is followed by a block 140 which awaits a further manual command—imparted, for example, by pressing one of the two buttons TS on mouse 55—indicating a predetermined position of pointer P has been reached. In the absence of said further command, block 140 goes back to block 120 to permit further movement of pointer P on image Im; and, upon said further command being detected, block 140 goes on to a block 150.

Obviously, further processes and/or operations may be performed concurrently with the operations described in the above blocks.

In other words, block 150 is selected on pointer P reaching a predetermined position, and determines the xp and yp coordinates of pointer P with respect to the X', Y', Z' reference system of image Im. The xp coordinate is expressed as the number of pixels in the image measured between pointer P and the image center CI and parallel to a minor side of image Im (image Im is rectangular); and the yp coordinate is expressed as the number of pixels in the image measured between pointer P and the image center CI and parallel to a major side of rectangular image Im.

The position of pointer P indicates a point of interest P(xp, yp) in two-dimensional image Im corresponding to a physical point Pf (FIG. 1) on the object in three-dimensional measuring space 47. In the example shown in FIGS. 1 and 7, the physical point Pf corresponds to the center of hole H.

Block 150 is followed by a block 160 which determines the distance dp (measured in pixels on image Im) between laser line 50 on the image and the image center CI.

Block 160 is followed by a block 170 which converts the pixel distance dp measured on the two-dimensional image Im into a distance dm expressed in millimeters and referenced to the X', Y', Z' reference system of visual sensor 25. Distance dm represents the distance, measured along the Z' axis, between laser line 50 and origin O'.

As stated, the conversion is made (in known manner) using the intrinsic parameters mentioned previously, and is therefore not described in detail.

Block 170 is followed by a block 180 which assigns the previously calculated distance dm to physical point Pf, i.e. the distance along the Z' axis of physical point Pf defined on image Im by pointer P is approximated equal to the distance of laser line 50 measured along the Z' axis, according to the equation:

$$pz = dm$$

where pz is the distance along the Z' axis of physical point Pf.

The above approximation is definitely acceptable when physical point Pf and laser line 50 are substantially coplanar with the same plane (not shown) perpendicular to optical axis 41 (FIG. 3).

Block 180 is followed by a block 190 which recalls the xp and yp coordinates determined previously in block 150. The xp and yp coordinates (measured in pixels on image Im) are converted (block 200 downstream from block 190) into respective distances xm, ym expressed in millimeters and referenced to the X', Y', Z' reference system of visual sensor 25. In this case also, the conversion is made (in known manner) using the intrinsic parameters mentioned previously, and is therefore not described in detail.

Block 200 therefore generates a pair of coordinates xm, ym representing the position along the X' and Y' axes of the physical point Pf corresponding to the point of interest selected by pointer P.

Block 200 is followed by a block 210 which converts the previously calculated xm, ym and dm coordinates defining the coordinates of physical point Pf with respect to the X' Y', Z' cartesian reference system of visual sensor 25—to the X, Y, Z reference system of machine 10 to generate coordinates Xm, Ym and Dm describing the position of physical point Pf with respect to the X, Y, Z axes of machine 10.

Block 210 is followed by a block 220 which moves measuring head 15 to set origin O' of the X', Y', Z' reference system to the position defined by the Xm, Ym and Dm coordinates.

The coordinates of physical point Pf with respect to X, Y, Z in fact are known from the operations described above, and the coordinates of O' with respect to X, Y, Z are also known by machine 10 which knows the value and orientation of vector V extending between origin O' of the X, Y, Z reference system and the origin O' of the X', Y', Z' reference system (FIG. 5).

Measuring head 15 is thus moved automatically and so positioned within the three-dimensional space that origin O' of the second X', Y', Z' reference system is located at a point within the three-dimensional space (physical point Pf) corresponding in two-dimensional image Im to the selected point of interest. The image center CI (which in fact corresponds to origin O' or point CR as seen in image Im) is therefore made to correspond to the point of interest defined previously by pointer P (FIG. 8).

Block 220 is followed by a block 230 which awaits a manual end-of-cycle command and, on receiving the command, terminates the above procedure. Conversely, block 230 goes back to block 100 to display image Im picked up by visual sensor 25 on the video. The new image shown, following the movement of measuring head 15 performed in block 220, comprises pointer P indicating the point of interest at image center CI. That is, image center CI is now "shifted" from the previous position to the position indicated by pointer P.

At the end of the above automatic positioning procedure, laser line 50 moves to the center of the image to indicate correct positioning along the Z' axis.

In actual use, the operator, after turning on measuring device 1, central processing unit 52 and personal computer PC, observes the image picked up by camera 31 on the video. Using pointer P, the operator selects the point of interest on image Im about which the image is to be centered, and, after setting the pointer to the point of interest, presses the button on mouse 55 to supply a confirm signal. The operations shown in blocks 150–220 are then activated automatically, and the measuring head is moved automatically so that the center of the newly detected image (i.e. the one picked up after the measuring head is moved) is located at the point previously selected by the pointer.

The image of the object displayed on the monitor is thus used in conjunction with pointer P to control the movement of measuring head 15 as required, and to set the measuring head to a predetermined position with respect to the object.

Clearly, changes may be made to the device and method as described herein without, however, departing from the scope of the present invention.

Figure 9:
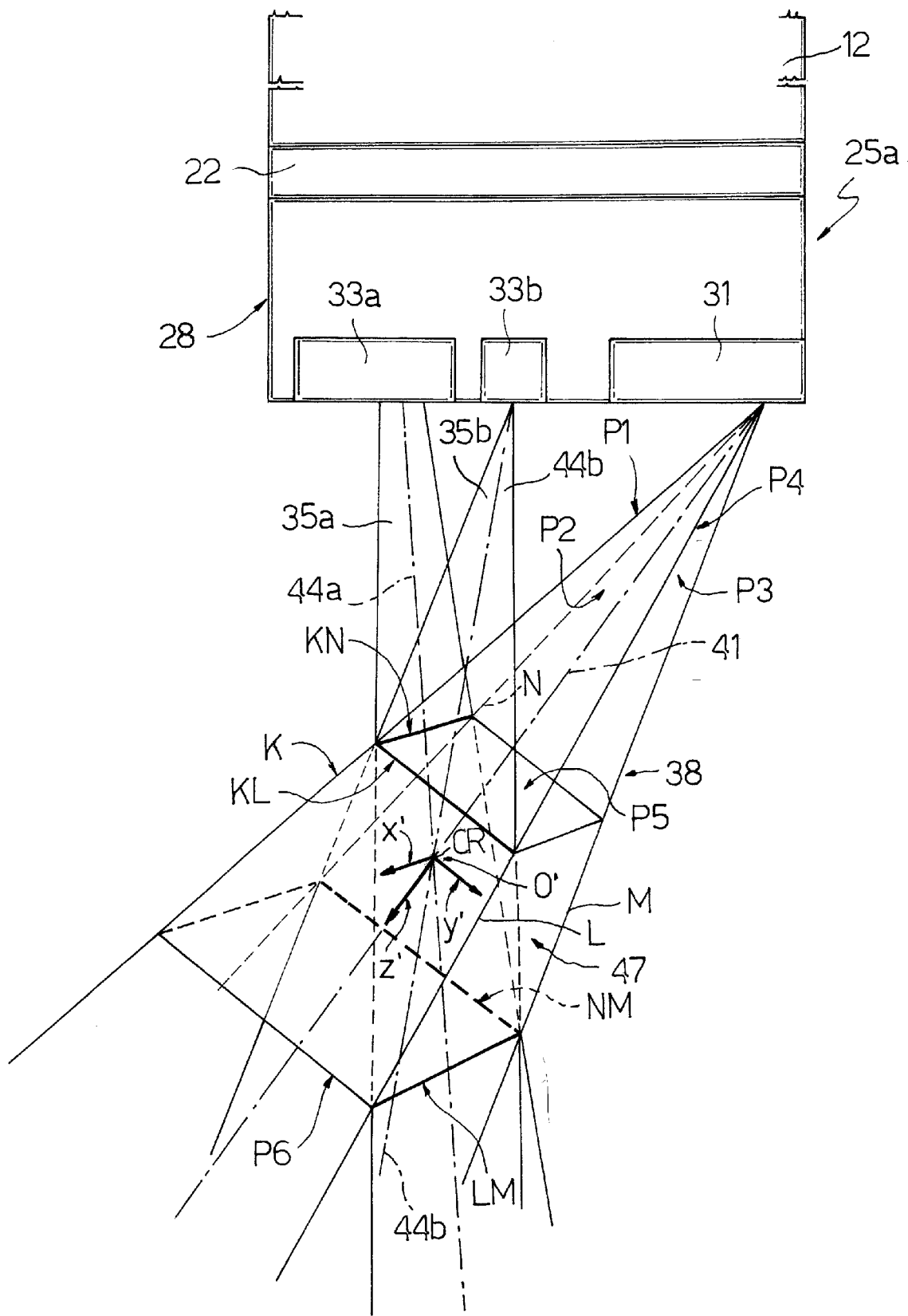
FIG. 9 shows a variation of the FIG. 1 measuring device.

For example, the device shown in FIG. 9 employs a visual sensor 25a employing two laser beams. As in FIG. 3, visual sensor 25a comprises an outer casing 28 connectable to connecting device 22 and housing a camera 31 (shown schematically) and a first source 33a of a laser beam 35a.

Camera 31 picks up a three-dimensional space 38 represented in FIG. 9 by a pyramid-shaped solid angle with the vertex located at the lens (not shown) of camera 31. Solid angle 38 has a respective optical axis 41 (shown by a dot-and-dash line) and is defined by four planes P1, P2, P3, P4 which intersect to define four edges K, L, M, N (indicated by straight lines) of solid angle 38.

Laser beam 35a has a respective axis of symmetry 44a (shown by a dot-and-dash line) which intersects three-dimensional space 38.

Visual sensor 25 also comprises a second source 33b of a laser beam 35b having a respective axis of symmetry 44b (shown by a dot-and-dash line) which intersects three-dimensional space 38.

The point at which axes 44a, 44b and 41 meet is indicated CR (reference center), and visual sensor 25a has a respective internal X', Y', Z' reference system, the origin O' of which is located at reference center CR, and the Z' axis of which is aligned along axis 41.

The intersection of laser beam 35a and solid angle 38 defines a measurable space 47 in the form of a truncated pyramid defined laterally by portions of planes P1, P2, P3, P4 and by a rectangular minor base plane P5 and a rectangular major base plane P6, both perpendicular to axis 41.

More specifically, plane P5 has a straight edge KN defined by beam 35a intersecting plane P1, and plane P6 has a straight edge LM defined by beam 35a intersecting plane P3.

Similarly, plane P5 has a straight edge KL defined by beam 35b intersecting plane P2, and plane P6 has a straight edge NM defined by beam 35a intersecting plane P4.

FIGS. 10a, 10b, 10c and 10d show a number of images to illustrate the operating principle of visual sensor 25a.

Figure 10A:
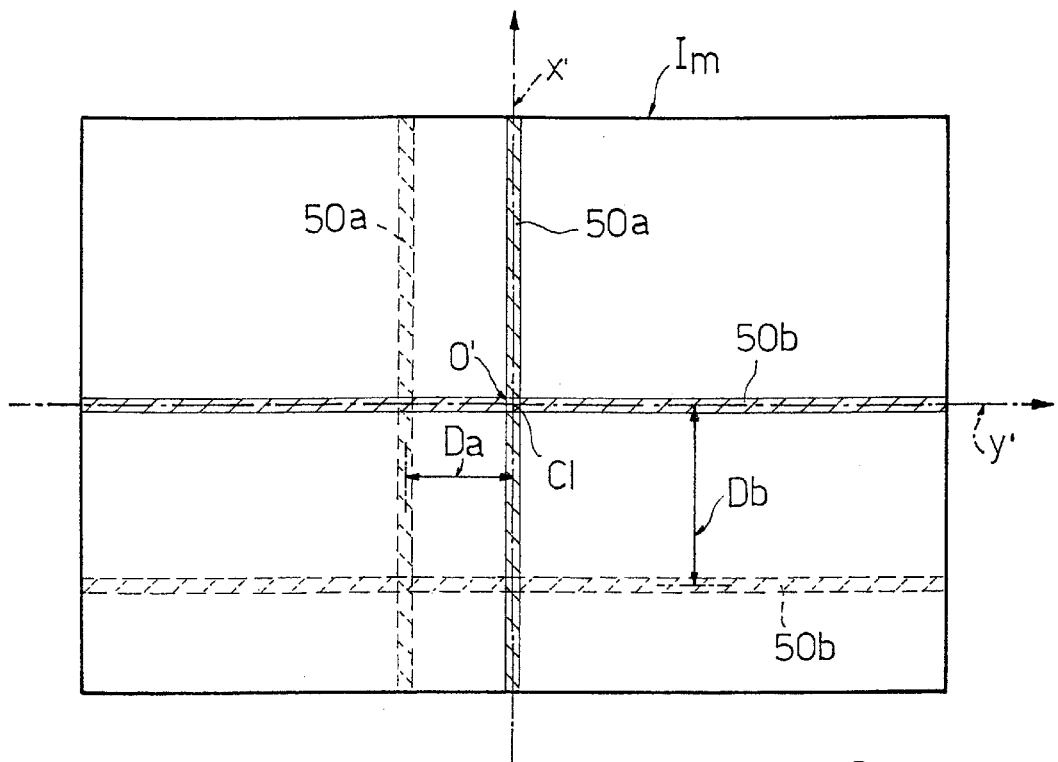
FIGS. 10a, 10b, 10c, 10d show images picked up by the visual sensor of the FIG. 9 device.
Figure 10B:
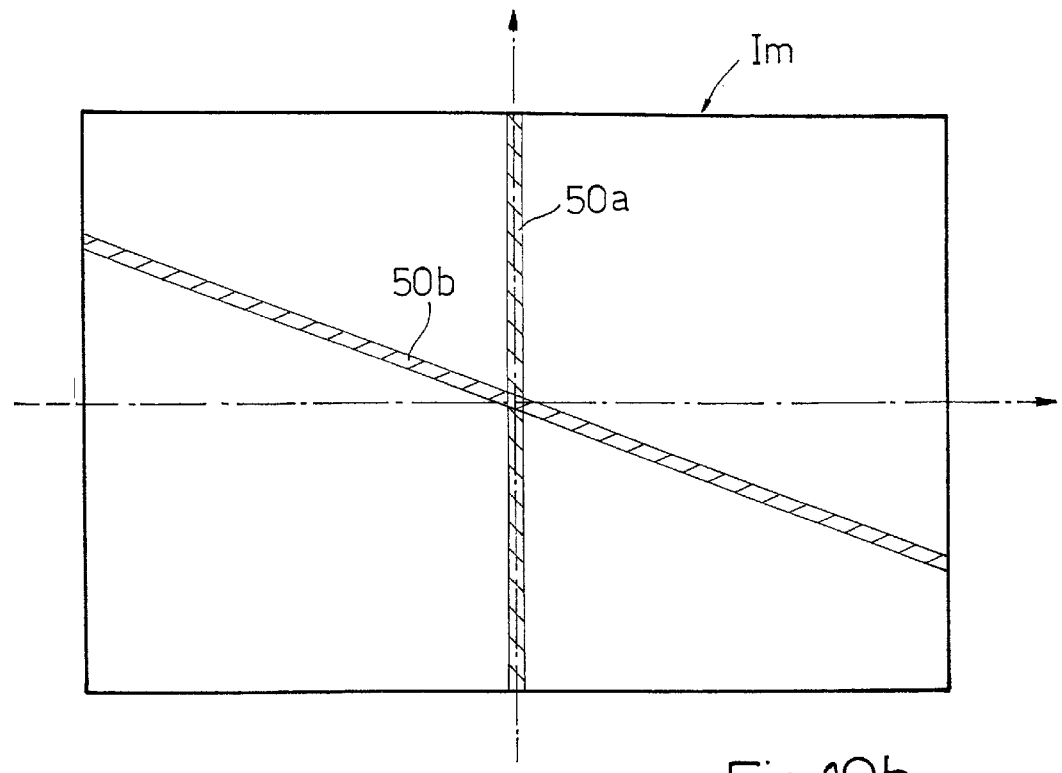
Figure 10C:
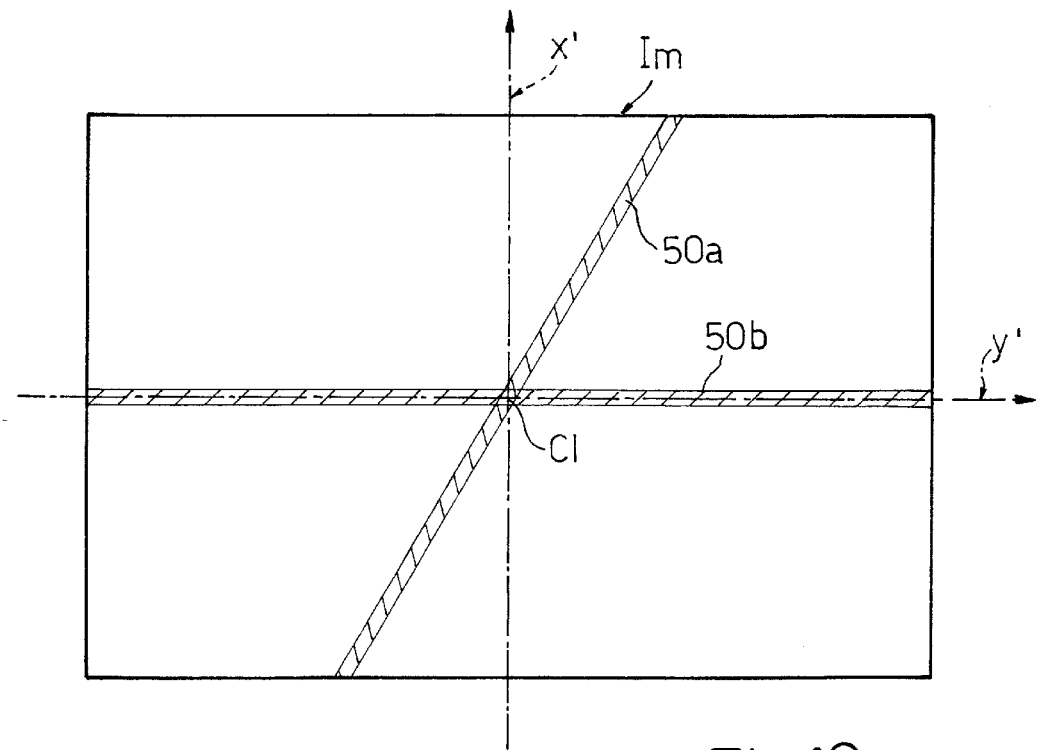
Figure 10D:
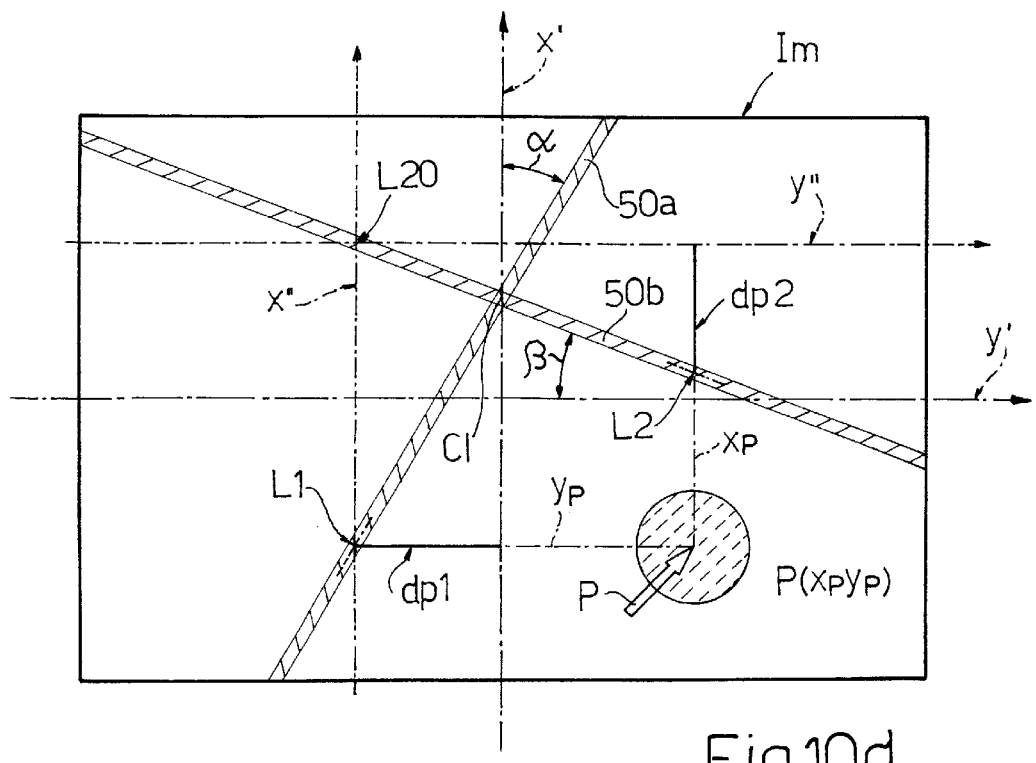

FIG. 10a shows an image picked up by camera 31 relative to a flat object (e.g. a metal plate, not shown) coplanar with a plane perpendicular to axis 41 and through the reference center. The image has a first laser line 50a formed by beam 35a intersecting the object, and a second laser line 50b formed by beam 35b intersecting the object; and laser lines 50a and 50b are perpendicular to each other and intersect at image center CI corresponding to reference center CR.

In the rectangular two-dimensional image picked up by camera 31, axes X', Y' may be oriented coplanar with the image plane, with origin O' located at image center CI (FIG. 10a).

As stated previously, movement of the object within measuring space 47 and perpendicular to axis 41 moves laser lines 50a, 50b in the detected image; which movement of each laser line with respect to a respective fixed reference point in the image—e.g. distance Da, Db between laser line 50a, 50b and the image center CI—is related to the position of the object along axis 41, and therefore to the distance of the object from camera 31.

In the example embodiment shown in FIG. 10a, the image is rectangular, image center CI coincides with the point at which the bisectors of the inside angles of the rectangular perimeter of the image meet, distance Da is measured parallel to a major side of the rectangular image, and distance Db is measured parallel to a minor side of the rectangular image.

The position of the Z' axis, which cannot be determined directly in the image, is determined with the aid of laser line 50a, 50b as stated previously.

Rotation of the flat object about an axis parallel to edges KN, LM has no tilting effect on laser line 50a, which remains perpendicular to the major sides of the image (FIG. 10b), but tilts laser line 50b with respect to laser line 50a.

Similarly, rotation of the flat object about an axis parallel to edges KL, NM has no tilting effect on laser line 50b, which remains perpendicular to the minor sides of the image (FIG. 10c), but tilts laser line 50a with respect to laser line 50b.

Combined rotation of the flat object about an axis parallel to edges KN, LM and about an axis parallel to edges KL, NM tilts the two laser lines 50a and 50b, which form respective angles $\alpha$ and $\beta$ with respect to axes X' and Y'.

The operations performed by the positioning device in the FIG. 9 variation are similar to those described with reference to blocks 100–150, 190, 200, 210 and 220 in FIG. 6, the main difference being in the calculation of distance dm (blocks 160; 170, 180) which, in the previous embodiment (FIG. 6) was calculated on the basis of one laser line (50).

To calculate distance dm, both laser lines 50a, 50b are used to perform the following operations (FIG. 10d):

on image Im, the distance dp1, in pixels, between a point L1 on first laser line 50a and image center CI is measured; point L1 has an X' coordinate equal to the X' coordinate xp of pointer P, i.e. the distance dp1 between the X' axis and.point L1 is measured;

distance dp1 is related by intrinsic parameters to the X', Y', Z' reference system and converted into a distance in millimeters to calculate a first dimension Z1;

a first auxiliary axis X" through point L1 and parallel to the X' axis is calculated;

the point L20 at which the first auxiliary axis X" and second laser line 50b intersect is calculated;

a second auxiliary axis Y" through point L20 and, parallel to the Y' axis is calculated;

on image Im, the distance dp2, in pixels, between a point L2 on second laser line 50b and axis Y" is measured; point L2 has an Y' (or Y") coordinate equal to the Y' coordinate yp of pointer P;

distance dp2 is related by intrinsic parameters to the X', Y', Z' reference system and converted into a distance in millimeters to calculate a second dimension Z2; and second dimension Z2 is added to the first dimension to obtain distance dm, i.e.

$$dm = Z1 + Z2$$

The above calculation of distance dm is more accurate than that described with reference to FIG. 6, by also taking into account inclination of the object with respect to axis 41. In some operating situations, however, the approximation made in block 180 may be sufficient.

What is claimed is:

1. In a device for positioning a measuring head on a noncontact three-dimensional measuring machine, wherein said measuring head of said measuring machine is movable in a three-dimensional measuring space; the measuring machine including means for determining the position of the measuring head with respect to a first reference system X, Y, Z related to the measuring machine and defined by a first cartesian reference frame defined by perpendicular coordinate X, Y, Z axes;

said measuring machine further comprising at least one visual sensor carried by the measuring head and having at least one television camera and generating means for generating at least one laser beam;

said camera imaging a two-dimensional image of the three-dimensional measuring space; said two-dimensional image comprising at least one reference point corresponding to the origin of a second reference system X', Y', Z' related to the visual sensor and having a first and a second coordinate axis X', Y' perpendicular to each other and in the plane defined by the two-dimensional image;

the improvement comprising processing and control means which include:

(a) display means cooperating with visual means to display to an operator said two-dimensional image picked up by said camera;

(b) presentation means for displaying pointing means on said two-dimensional image;

(c) control means operated by said operator to move the pointing means on the displayed said two-dimensional image and indicate portions of the displayed two-dimensional image;

(d) means for selecting on the displayed said two-dimensional image a point of interest indicated by said pointing means;

(e) automatic control means for moving said measuring head automatically into such a position within the three-dimensional measuring space that the origin of said second reference system X', Y', Z' is located, in the three-dimensional space, at a physical point corresponding on said two-dimensional image to said point of interest selected by means of said pointing means.

2. A device as claimed in claim 1, characterized in that said automatic control means (150–220) comprise:

detecting means (150, 160) for determining the coordinates (xp, yp, dp) of the point of interest selected (140) on said two-dimensional image (Im);

converting means (170, 200) for converting the coordinates (xp, yp, dp) determined on said two-dimensional image (Im) into three-dimensional coordinates (xm, ym, zm) referenced to said second reference system;

further converting means (210) for converting said three-dimensional coordinates (xm, ym, zm) referenced to said second reference system into three-dimensional coordinates (Xm, Ym, Dm) referenced to said first reference system, so as to generate coordinates (Xm, Ym, Dm) defining a repositioning position;

control means (220) for so moving said measuring head that the origin (O') of said second reference system X', Y', Z' is located at the position defined by the coordinates (Xm, Ym, Dm) defining said repositioning position.

3. A device as claimed in claim 2, wherein said laser beam impinges on an object being measured in said three-dimensional measuring space to produce at least one laser line (50) on the object; characterized in that said detecting means (150, 160) comprise:

first detecting means (160) for determining the position (dp) of said laser line (50) with respect to said reference point (CI) of said two-dimensional image (Im);

said converting means (170, 200) comprising first converting means (170) for converting the determined said position (dp) of the laser line (50) into a distance measured along the Z' axis of said second reference system X', Y', Z' to obtain a first three-dimensional coordinate (zm) referenced to the second reference system.

4. A device as claimed in claim 3, characterized by comprising assigning means (180) for assigning said first three-dimensional coordinate (zm), determined by means of said laser line, to said physical point (Pf), in the three-dimensional space, corresponding on said two-dimensional image to the point of interest (xp, yp) selected on the two-dimensional image by means of said pointing means (P).

5. A device as claimed in claim 3, wherein further generating means (33b) for generating a further laser beam (35b) are provided;

said laser beam (35a) impinging on an object being measured in said three-dimensional space to produce a first laser line (50a) on the object, and said further laser beam (35b) impinging on said object to produce a second laser line (50b) on the object;

said detecting means (150, 160) determining the location of said first laser line (50a) and said second laser line (50b) with respect to said reference point (CI) of said two-dimensional image (Im) to determine a first three-dimensional coordinate (zm) of said physical point along the Z' axis.

6. A device as claimed in claim 5, characterized in that said detecting means perform the following operations:

measuring, on said two-dimensional image (Im), a first distance (dp1) between a first point (L1) on the first laser line (50a) and said reference point (CI); said first point (L1) having a coordinate, along a first axis (X') of the second reference system, equal to a first coordinate (xp), along said first axis (X'), of the point of interest indicated by the pointing means (P);

converting said first distance (dp1), determined ion said two-dimensional image, into a distance referenced to the second reference system X', Y', Z' to calculate a first dimension (Z1);

calculating a first auxiliary axis (X") through the first point (L1) and parallel to said first axis (X') of the second reference system;

calculating the point of intersection (L20) of the first auxiliary axis (X") and the second laser line (50b);

calculating a second auxiliary axis (Y") through the point of intersection (L20) and parallel to a second axis (Y') of the second reference system X', Y', Z';

measuring, on the two-dimensional image (Im), a second distance (dp2) between a second point (L2) on the second laser line (50b) and the second auxiliary axis (Y"); said second point (L2) having a coordinate, along a second axis (Y') of the second reference system, equal to a second coordinate (yp), along said second axis (Y'), of the point of interest indicated by the pointing means (P);

converting said second distance (dp2), determined on said two-dimensional image, into a distance referenced to the second reference system X', Y', Z' to calculate a second dimension (Z2); and composing the first (Z1) and the second (Z2) dimension to obtain said first three-dimensional coordinate (zm) of said physical point (Pf) along the Z' axis.

7. A device as claimed in claim 2, characterized in that said detecting means (150) also comprise:

second detecting means (150) for determining the positions (xp, yp) of said pointing means (P) with respect to the reference point of said two-dimensional image (Im) and along two coordinate axes of the two-dimensional image (Im);

said converting means (170, 200) also comprising second converting means (200) for converting the determined said positions (xp, yp) into respective distances measured along the X' and Y' axes of said second reference system, to obtain a second and a third three-dimensional coordinate (xm, ym) referenced to said second reference system.

8. A device as claimed in claim 1, characterized in that said camera (31) picks up said three-dimensional space (38), in particular a space in the form of a solid angle having a respective optical axis (41);

said at least one laser beam (35) having a respective axis of symmetry (44; 44a, 44b) intersecting said three-dimensional space (38);

the point at which said optical axis (41) and said axis of symmetry (44) meet defining the origin of a second cartesian reference frame (X', Y', Z') of said second reference system;

the origin of said second Cartesian reference frame corresponding, on said two-dimensional image (Im), to said reference point (CI);

said second Cartesian reference frame being defined by perpendicular coordinate X', Y', Z' axes, of which the Z' axis is oriented along said optical axis (41).

9. A method of positioning a measuring head on a noncontact three-dimensional measuring machine, wherein said measuring head (15) of said measuring machine (1, 10) is movable in a three-dimensional measuring space (T); the measuring machine (10) having means for determining the position of the measuring head (15) with respect to a first reference system X, Y, Z proper to the measuring machine (1, 10) and defined by a first cartesian reference frame defined by perpendicular coordinate X, Y, Z axes;

said measuring machine (1, 10) also comprising at least one visual sensor (25) carried by the measuring head (15) and having at least one television camera (31) and a source (33) for a laser beam (35);

said camera (31) picking up a two-dimensional image (Im) of the three-dimensional measuring space (T); said two-dimensional image (Im) comprising at least one reference point (CI) corresponding to the origin of a second reference system X', Y', Z' proper to the visual sensor (25) and having a first and a second coordinate axis X', Y' perpendicular to each other and in the plane defined by the two-dimensional image (Im);

characterized by comprising the steps of:

displaying (100) on visual means (54a) said two-dimensional image (Im) picked up by said camera (31);

presenting (110) on the displayed said two-dimensional image (Im) pointing means (P) movable (120, 130) by manual control (55) on the two-dimensional image to indicate portions of the two-dimensional image (Im);

selecting (140), by means of said pointing means (P), a point of interest (xp, yp) indicated on the displayed said two-dimensional image (Im);

moving (220) said measuring head automatically (150–210) into such a position within the three-dimensional measuring space that the origin (O') of said second reference system X', Y', Z' is located, in the three-dimensional space, at a physical point (Pf) corresponding on said two-dimensional image to the selected said point of interest (xp, yp).

10. A method as claimed in claim 9, characterized in that said step of moving (220) said measuring head automatically (150–210) comprises the steps of:

determining (150) the coordinates (xp, yp, dp) of said point of interest selected (140) on said two-dimensional image (Im);

converting (170, 190) said coordinates (xp, yp, dp) determined on said two-dimensional image (Im) into three-dimensional coordinates (Xm, Ym, Zm) referenced to said second reference system;

converting (200) said three-dimensional coordinates (xm, ym, zm) referenced to the second reference system X', Y', Z' into three-dimensional coordinates (Xm, Ym, Dm) referenced to said first reference system X, Y, Z, so as to obtain a repositioning position;

so moving (220) said measuring head that the origin (O') of said second reference system X', Y', Z' is located at the position defined by the coordinates (Xm, Ym, Dm) defining said repositioning position.

11. A method as claimed in claim 10, characterized in that said step of determining (150) the coordinates (xp, yp, dp) of said point of interest selected (140) on said two-dimensional image (Im) comprises the substeps of:

causing said laser beam to impinge on an object being measured in said three-dimensional space to produce a laser line (50) on the object;

determining (160) the position (dp) of said laser line (50) with respect to said reference point of said two-dimensional image (Im); and converting (170) the determined position (dp) of the laser line into a distance measured along the Z' axis of said second reference system X', Y', Z' to obtain a first three-dimensional coordinate (zm) referenced to the second reference system.

12. A method as claimed in claim 11, characterized by also comprising the step of assigning (180) said first three-dimensional coordinate (zm), determined by means of said laser line, to said physical point (Pf), in the three-dimensional space, corresponding on said two-dimensional image to the point of interest selected on the two-dimensional image by means of said pointing means (P).

13. A method as claimed in claim 11, characterized in that said step of determining (150) the coordinates (xp, yp, dp) of said point of interest selected (140) on said two-dimensional image (Im) comprises the substeps of:

generating (33a) a first laser beam (35a) and causing said first laser beam (35a) to impinge on an object to produce a first laser line (50a) visible in said two-dimensional image (Im);

generating (33b) a second laser beam (35b) and causing said second laser beam (35b) to impinge on said object to produce a second laser line (50b) visible in said two-dimensional image (Im);

determining the location of said first laser line (50a) and said second laser line (50b) with respect to said reference point (CI) of said two-dimensional image (Im) to determine a first three-dimensional coordinate (zm) of said physical point (Pf) along the Z' axis.

14. A method as claimed in claim 13, characterized in that said step of determining a first three-dimensional coordinate (zm) comprises the substeps of:

measuring, on said two-dimensional image (Im), a first distance (dp1) between a first point (L1) on the first laser line (50a) and said reference point (CI); said first point (L1) having a coordinate, along a first axis (X') of the second reference system X', Y', Z', equal to a first coordinate (xp), along said first axis (X'), of the point-of interest indicated by the pointing means (P);

converting said first distance (dp1), determined on said two-dimensional image, into a distance referenced to the second reference system X', Y', Z' to calculate a first dimension (Z1);

calculating a first auxiliary axis (X") through the first point (L1) and parallel to said first axis (X') of the second reference system;

calculating the point of intersection (L20) of the first auxiliary axis (X") and the second laser line (50b);

calculating a second auxiliary axis (Y") through the point of intersection (L20) and parallel to a second axis (Y') of the second reference system X', Y', Z';

measuring, on the two-dimensional image (Im), a second distance (dp2) between a second point (L2) on the second laser line (50b) and the second auxiliary axis (Y"); said second point (L2) having a coordinate, along a second axis (Y') of the second reference system, equal to a second coordinate (yp), along said second axis (Y'), of the point of interest indicated by the pointing means (P);

converting said second distance (dp2), determined is on said two-dimensional image, into a distance referenced to the second reference system (X', Y', Z') to calculate a second dimension (Z2); and composing the first (Z1) and the second (Z2) dimension to obtain said first three-dimensional coordinate (zm) of said physical point (Pf) along the Z' axis.

15. A method as claimed in claim 11, characterized in that said step, of determining (150) the coordinates (xp, yp, dp) of said point of interest selected (140) on said two-dimensional image (Im) comprises the substeps of:

determining (150) the positions (xp, yp) of said pointing means (P) with respect to the reference point (CI) of said two-dimensional image (Im) and along two coordinate axes of the two-dimensional image (Im); and converting (200) the determined said positions (xp, yp) into respective distances measured along the X' and Y' axes of said second reference system, to obtain a second and a third three-dimensional coordinate (xm, ym) referenced to said second reference system.

16. A method as claimed in claim 9, characterized in that said camera (31) picks up said three-dimensional space (38), in particular a space in the form of a solid angle having a respective optical axis (41);

said laser beam (35) having a respective axis of symmetry (44) intersecting said three-dimensional space (38);

the point at which said optical axis (41) and said axis of symmetry (44) meet defining the origin of a second cartesian reference frame X', Y', Z' of said second reference system of said visual sensor;

the origin of said second cartesian reference frame corresponding, on said two-dimensional image (Im), to said reference point;

said second cartesian reference frame being defined by perpendicular coordinate X', Y', Z' axes, of which a Z' axis is oriented along said optical axis (41).

\* \* \* \* \*